(12) United States Patent
Lawrence

(10) Patent No.: US 6,219,443 B1
(45) Date of Patent: Apr. 17, 2001

(54) METHOD AND APPARATUS FOR INSPECTING A DISPLAY USING A RELATIVELY LOW-RESOLUTION CAMERA

(75) Inventor: William Richard Lawrence, Windsor, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/132,446

(22) Filed: Aug. 11, 1998

(51) Int. Cl.$^7$ ............................................. G06K 9/00
(52) U.S. Cl. ........................ 382/141; 345/904; 348/92; 324/770
(58) Field of Search ................................ 382/141, 144, 382/149, 151, 152; 345/904, 147, 87, 214, 117; 348/86, 92, 125, 184, 189; 324/770

(56) References Cited

U.S. PATENT DOCUMENTS

| | | | |
|---|---|---|---|
| 5,204,617 | * 4/1993 | Kumagai | 345/904 |
| 5,293,178 | * 3/1994 | Kobayashi | 345/904 |
| 5,717,780 | * 2/1998 | Mitsumune et al. | 382/141 |
| 5,825,196 | * 10/1999 | Irie et al. | 324/770 |
| 5,966,458 | * 10/1999 | Yukawa et al. | 382/141 |
| 6,154,561 | * 11/2000 | Pratt et al. | 382/141 |

* cited by examiner

Primary Examiner—Joseph Mancuso
Assistant Examiner—Vikkram Bali

(57) ABSTRACT

The present invention provides a method and apparatus for detecting defects in a display. The apparatus of the present invention comprises a camera for capturing an image of a display being inspected and processing circuitry, such as, for example, a microprocessor or a digital signal processor (DSP), for processing the captured image to determine whether or not the display being inspected is defective. Preferably, the processing circuitry is a microprocessor running image processing software which controls data acquisition as well as the processing of the acquired data to determine whether the display being inspected is defective. In accordance with the present invention, a relatively high resolution display can be inspected using a single camera, preferably a charge-coupled device (CCD) camera, which has a lower resolution than the display being inspected. The camera is focused on the display such that the entire display is within the field of view of the camera. The camera then captures an image of the display, digitizes the image and stores the digitized image in a memory device which is in communication with the processing circuitry. The processing circuitry then reads the image data out of memory and averages all of the image data to obtain an average value corresponding to the brightness of the display. Once this average value has been obtained, the processing circuitry performs various processes with the image data and with the average value to determine whether the display being inspected is defective.

41 Claims, 5 Drawing Sheets

METHOD AND APPARATUS FOR INSPECTING A DISPLAY USING A RELATIVELY LOW-RESOLUTION CAMERA

TECHNICAL FIELD OF THE INVENTION

The present invention relates to a method and apparatus for testing displays and, more particularly, to a method and apparatus for testing displays that utilizes a CCD camera having a relatively low resolution compared to the resolution of a display being inspected.

BACKGROUND OF THE INVENTION

Currently, most if not all cathode ray tubes (CRT) and liquid crystal displays (LCDs) are inspected visually to determine if all of the pixels in the display are functioning correctly. This is accomplished by displaying one or more patterns on the display while a person observes the pattern to spot defects. This method has several disadvantages. One disadvantage is that the person observing the patterns on the display must look closely and carefully at the entire screen in order to spot defects, which can be very time consuming, thus adding to the costs associated with the inspection. Another disadvantage of this method is that human beings are not always highly consistent in this type of inspection and, therefore, results can vary from day-to-day when performed by the same person and from person to person when performed by different people.

It is also known to inspect displays using high-resolution cameras. However, this type of inspection requires that the camera used to inspect the display have a higher resolution than the display being inspected. If the display has a low resolution, it is possible to use a high-resolution camera to inspect the display by feeding the output of the camera into a computer and having the computer analyze patterns on the display to determine whether or not defects exist in the display.

In most cases, a nine-to-one increase in the number of camera pixels to the number of display pixels is required in order to properly inspect the displays. This ratio requirement effectively limits the resolution of the display that can be tested and/or adds greatly to the cost of the camera used for the inspection. Furthermore, if a single camera is used to perform the inspection and the camera resolution is close to the display resolution, then the detection system can only detect large defects, i.e., defects covering more than a four-pixel area. Multiple cameras can be used in place of a single high-resolution camera to perform the inspection. However, using multiple cameras can greatly increase inspection time and cost of the test due to the added costs due to the added costs of multiple cameras and additional processing time.

Accordingly, a need exists for a method and apparatus for inspecting displays for defects which is capable of efficiently detecting defects, including small defects, and which overcomes the disadvantages of the existing inspection systems and methods.

SUMMARY OF THE INVENTION

The present invention provides a method and apparatus for detecting defects in a display. The apparatus of the present invention comprises a camera for capturing an image of a display being inspected and processing circuitry, such as, for example, a microprocessor or a digital signal processor (DSP), for processing the captured image to determine whether or not the display being inspected is defective. Preferably, the processing circuitry is a microprocessor running image processing software which controls data acquisition as well as the processing of the acquired data to determine whether the display being inspected is defective. In accordance with the present invention, a relatively high resolution display can be inspected using a single camera, preferably a charge-coupled device (CCD) camera, which has a lower resolution than the display being inspected.

The camera is focused on the display such that the entire display is within the field of view of the camera. The camera then captures an image of the display, digitizes the image and stores the digitized image in a memory device which is in communication with the processing circuitry. The processing circuitry then reads the image data out of memory and averages all of the image data to obtain an average value corresponding to the brightness of the display. In accordance with a first embodiment of the present invention, once this average value has been obtained, blocks of the image data are read out of memory, such as, for example, 4×4 pixel blocks, and each of the blocks are averaged and compared to the display average to determine whether or not the average value for each of the blocks is equal to the average value for the entire display. The result of this comparison is then stored in memory. The next block of data is then read out of memory, averaged, and the block average is compared to the display average.

This process is performed until the last block of the image data has been processed. The processing circuitry then analyzes the results to determine the locations of defects in the display and the results of the inspection are then stored in memory and/or output to a peripheral device coupled to the processing circuitry such as, for example, a display monitor, so that the person performing the inspection is informed of the locations of any defects in the display being inspected. If a defect is found in any block of image data, the location of the defect is known by the processing circuitry because the manner in which the pixel coordinates on the display are mapped into locations in memory is known by the processing circuitry, as will be understood by those skilled in the art. Therefore, once a defect is found in a block of image data, the location of the pixels on the display that correspond to the block of image data can be determined by the processing circuitry.

In accordance with a second embodiment of the present invention, the processing circuitry averages the image data corresponding to the entire display and then calculates the standard deviation for the entire display. This standard deviation is then compared to an acceptable standard deviation for the particular type of display being inspected and the results of the comparison are stored in memory and/or are output on a peripheral device coupled to the processing circuitry such as, for example, a display monitor, so that the person performing the inspection is informed of the results of the inspection. By using the standard deviation process, large areas of weak pixels and cloudy areas in the display being inspected can be located.

In accordance with a third embodiment of the present invention, large blocks of the image data are read out of memory and each block, which may be, for example, a 100×100 block of pixels, is averaged and the average of each block is compared to the display average by using the process discussed above with respect to the first embodiment. However, after each block has been averaged and compared to the display average, a standard deviation value is calculated for each block and a determination is made as to whether the standard deviation for each block is acceptable. The results of this determination are stored in memory and/or output via a peripheral device to the person performing the inspection.

In accordance with the preferred embodiment of the present invention, the present invention utilizes a process which incorporates the processes of the first, second and third embodiments of the present invention. In accordance with the preferred embodiment, once the average and standard deviation have been computed for the entire display image, a determination is made as to whether the standard deviation and the average for the display image is within the specification limits for the particular display being inspected. If not, the process and circuitry of the present invention determines that the display has failed the inspection test. If the computed average and standard deviation are within specification limits, each pixel on the display is compared with the display average +/– an offset, which is a predetermined tolerance value that depends on the type of display being inspected and on the application for which the display will be used. The results of this comparison are then used to determine whether the number of bad pixels, i.e., the number of pixels outside of the standard deviation of the display average, and the location of the bad pixels, are within the specifications for the particular display being inspected. If not, the processing circuitry determines that the display being inspected has failed the test. If so, then small blocks of pixels are averaged and the standard deviation for the blocks is calculated and these values are compared against the display average +/– the offset to determine whether each of the blocks is good or bad.

A determination is then made as to whether the bad blocks or subgroups, i.e., the number of blocks that did not fall within the computed display average +/– the offset, and the locations of the bad subgroups, are within the specifications for the particular display being inspected. If not, the processing circuitry determines that the display has failed the inspection test. If so, then this process is repeated for larger blocks of pixels on the display. Once the entire process been performed for all of the blocks and with all of the pixels of the display, either all on or all off, the inspection is completed.

These and other features and advantages of the present invention will become apparent from the following descriptions, drawings and claims.

DETAILED DESCRIPTION OF THE INVENTION

Figure 1:
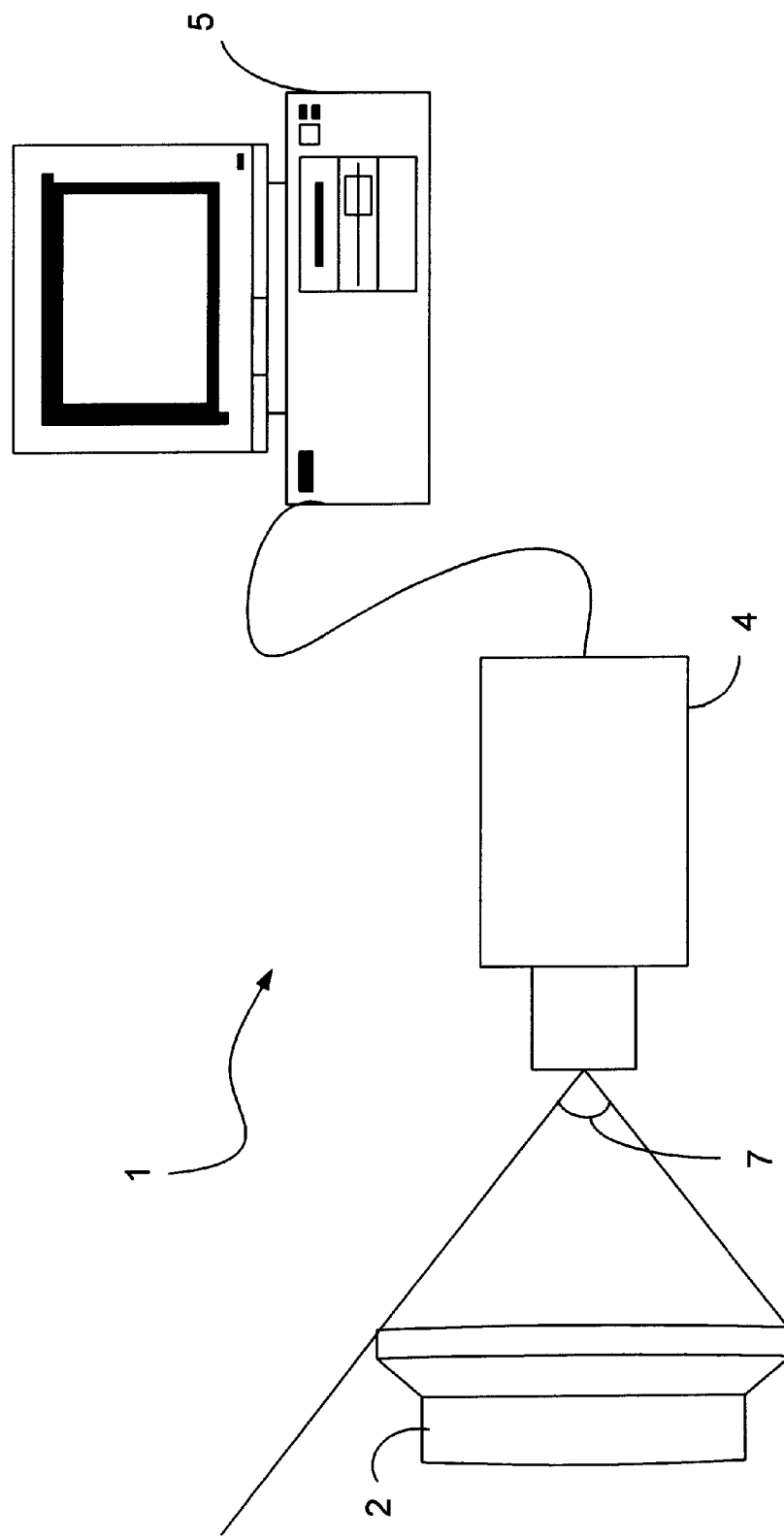
FIG. 1 is a block diagram illustrating a display inspection system in accordance with the present invention for inspecting a display for defects.
Figure 2:
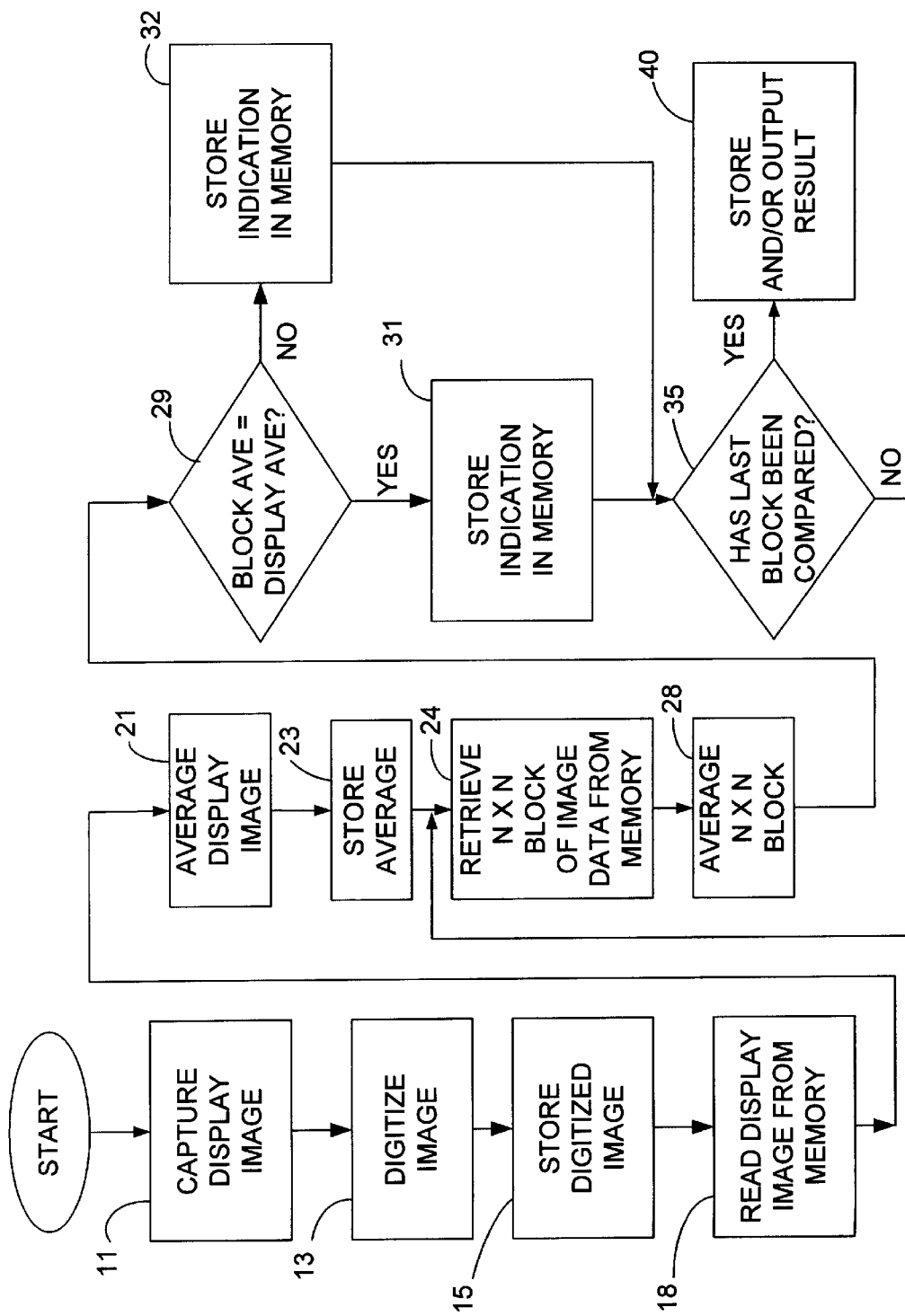
FIG. 2 is a flow chart illustrating the method of the present invention utilized by the system shown in FIG. 1 for determining whether defects exist in a display being inspected.

The inspection apparatus 1 of the present invention for inspecting a display 2 comprises a camera 4 for capturing an image of the display 2 and processing circuitry 5 for processing the captured image to determine whether or not the display 2 being inspected is defective. Although the processing circuitry of the present invention is represented in FIG. 1 as a stand-alone computer, it will be understood by those skilled in the art that the present invention is not limited to any particular type of processing circuitry for processing the captured image. The processing circuitry may be, for example, any type of microprocessor or microcontroller, a digital signal processor (DSP), an application specific integrated circuit (ASIC), a programmable logic controller (PLC), a programmable logic array (PLA), etc. Preferably, the processing circuitry is a microprocessor running image processing software which controls data acquisition as well as the processing of the acquired data to determine whether the display being inspected is defective.

The display 2 may be any type of display, including, for example, cathode ray tubes (CRTs), liquid crystal display (LCDs), televisions, computer monitors, etc. Essentially, the inspection system of the present invention is suitable for inspecting any type of light-reflecting or light-illuminating display. In accordance with the present invention, a relatively high resolution display 2 can be inspected using a single camera 4, preferably a charge-coupled device (CCD) camera, which may have a lower resolution than the display being inspected. A camera having a higher resolution than the display 2 may also be used for the inspection. However, displays typically have higher resolutions than cameras. Although the methods of the present invention will work equally well if the camera 4 has a higher resolution than the display 2 being inspected, using a single camera having a very high resolution may be cost prohibitive. Furthermore, using a high-resolution camera would defeat one of the objectives of the present invention, which is to use a low resolution camera to inspect a high display.

It should be noted that any type of camera can be used with the inspection system of the present invention. Preferably, a digital output camera is used which converts the image data into digital data so that an analog-to-digital converter that is external to the camera is not needed. Preferably, the camera used with the present invention has a high fill factor. However, it is not necessary for the camera to have a high fill factor, as will be understood by those skilled in the art.

All of the embodiments of the present invention take advantage of the fact that each camera pixel is capable of detecting differences in light intensity resulting from a single display pixel being on or off. Preferably, each camera pixel has a resolution of at least 8 bits, which means that each pixel is capable of measuring at least 256 levels of light intensity. If the display-to-camera resolution is 4-to-1, for example, each camera pixel is viewing 4 display pixels. When the camera pixels are aligned with the display pixels, each camera pixel will be centered on a block of 4 display pixels. If an "all on" inspection is being performed and one of the 4 display pixels being viewed by the camera pixel is "stuck off" or, in other words, dead, the camera pixel will have a digital value corresponding to approximately 25% less than its digital value when all 4 display pixels are on. Similarly, if 2 of the display pixels are dead, the camera pixel will have a digital value corresponding to approximately 50% less than its digital value when all 4 pixels are on. If an "all off" inspection is being performed and 1 of the display pixels is "stuck on", the camera pixel will have a substantially higher digital value than the average value, which will enable the inspection system to detect the stuck on pixel.

One of the advantages of the present invention over other display inspection systems is that the inspection system 1 of the present invention does not require the camera pixels to be aligned with the display pixels. This is extremely advantageous because, when dealing with high-resolution displays, very small incremental movements in either the display or the camera, and/or small changes in focus of the camera, will cause the camera pixels not to line up with the display pixels. If the display-to-camera pixel resolution is 4-to-1, as in the example provided above, and the camera pixels are not aligned with the display pixels, 1 display pixel may be straddled by 4 camera pixels in the worst case scenario. Therefore, 4 camera pixels will be viewing one display pixel. In this case, if the display pixel is stuck off, each of the 4 camera pixels will have a digital value corresponding to approximately 6% of its value if all 4 display pixels being viewed by the camera pixel were on. Although this is a much smaller difference in value than the 25% reduction measured when the camera pixels are aligned with the display pixels, it is a sufficient reduction in intensity to be measured by camera pixels having an 8-bit resolution.

The operation of the inspection system 1 of the present invention will now be discussed with respect to the various embodiments of the present invention shown in FIGS. 2–5. In accordance with the first embodiment of the present invention shown in FIG. 2, the camera 4 is focused on the display 2 such that the entire display 2 is within the field of view of the camera 4. The camera 4 then captures an image of the display 2, as indicated at step 11, digitizes the image, as indicated at step 13, and stores the digitized image in a memory device (not shown), as indicated at step 15, which is in communication with the processing circuitry 5. The memory device may be the hard drive or RAM of the computer shown in FIG. 1, or it may be a separate memory device in communication with the computer. The processing circuitry 5 then reads the image data out of memory, as indicated at step 18, and averages all of the image data to obtain an average value corresponding to the brightness of the display 2, as indicated at step 21. This average display value is then stored in memory, as indicated at step 23. Once this average value has been obtained, blocks of the image data are read out of memory, such as, for example, 4×4 pixel blocks, as indicated by step 24, and each of the blocks are averaged and compared to the display average to determine whether or not the average value for each of the blocks is equal to the average value for the entire display, as indicated at steps 28 and 29. The result of this comparison is then stored in memory, as indicated at steps 31 and 32. The next block of data is then read out of memory, averaged, and the block average is compared to the display average, as indicated at steps 31, 32, 24, 28 and 29. The result of this comparison is then stored in memory at step 31.

This process is performed until the last block of the image data has been processed, as indicated at step 35. The processing circuitry then analyzes the results to determine the locations of defects in the display and the results of the inspection are then stored in memory and/or output to a peripheral device coupled to the processing circuitry such as, for example, a display monitor, so that the person performing the inspection is informed of the locations of any defects in the display being inspected, as indicated at step 40. If a defect is found in any block of image data, the location of the defect is known by the processing circuitry 5 because the manner in which the pixel coordinates on the display are mapped into locations in memory is known by the processing circuitry 5, as will be understood by those skilled in the art. Therefore, once a defect is found in a block of image data, the location of the pixels on the display that correspond to the block of image data can be determined by the processing circuitry 5.

Figure 3:
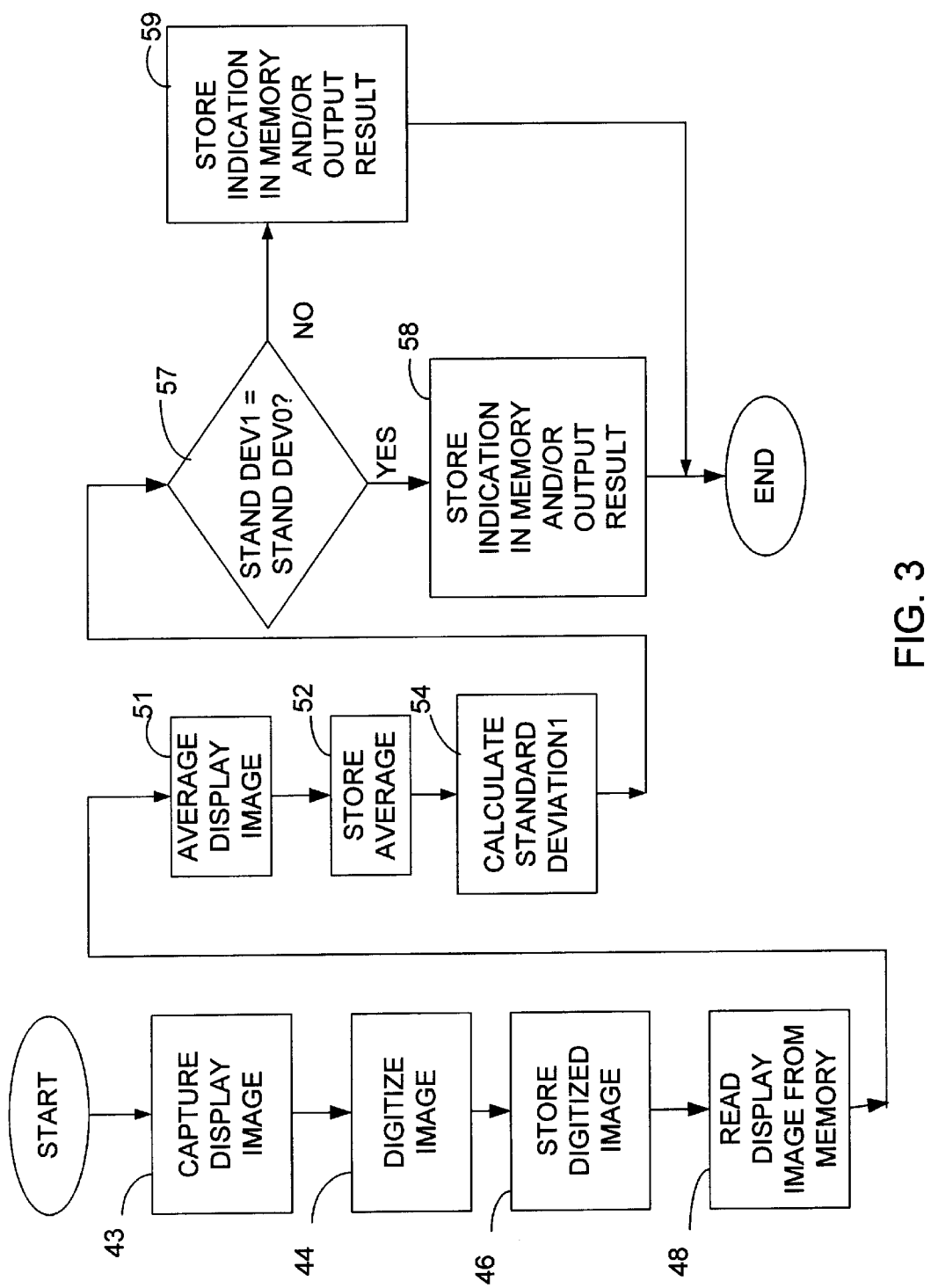
FIG. 3 is a flow chart illustrating the method of the present invention utilized by the system shown in FIG. 1 in accordance with a second embodiment for determining whether defects exist in a display being inspected.

In accordance with a second embodiment of the present invention, which is illustrated in FIG. 3, the processing circuitry 5 averages the image data corresponding to the entire display and then calculates the standard deviation for the entire display. The camera 4 is focused on the display 2 such that the entire display 2 is within the field of view of the camera 4. The camera 4 then captures an image of the display 2, as indicated at step 43, digitizes the image, as indicated at step 44, and stores the digitized image in memory, as indicated at step 46, which is in communication with the processing circuitry 5. The processing circuitry 5 then reads the image data out of memory, as indicated at step 48, and averages all of the image data to obtain an average value corresponding to the brightness of the display 2, as indicated at step 51. This average display value is then stored in memory, as indicated at step 52. Once this average value has been obtained, the standard deviation is calculated for the display image, as indicated at step 54. This standard deviation is then compared to an acceptable standard deviation for the particular type of display being inspected, as indicated at step 57. The results of the comparison are stored in memory and/or are output on a peripheral device coupled to the processing circuitry such as, for example, a display monitor, so that the person performing the inspection is informed of the results of the inspection, as indicated at steps 58 and 59. By using the standard deviation process, large areas of weak pixels and cloudy areas in the display 2 can be located.

Figure 4:
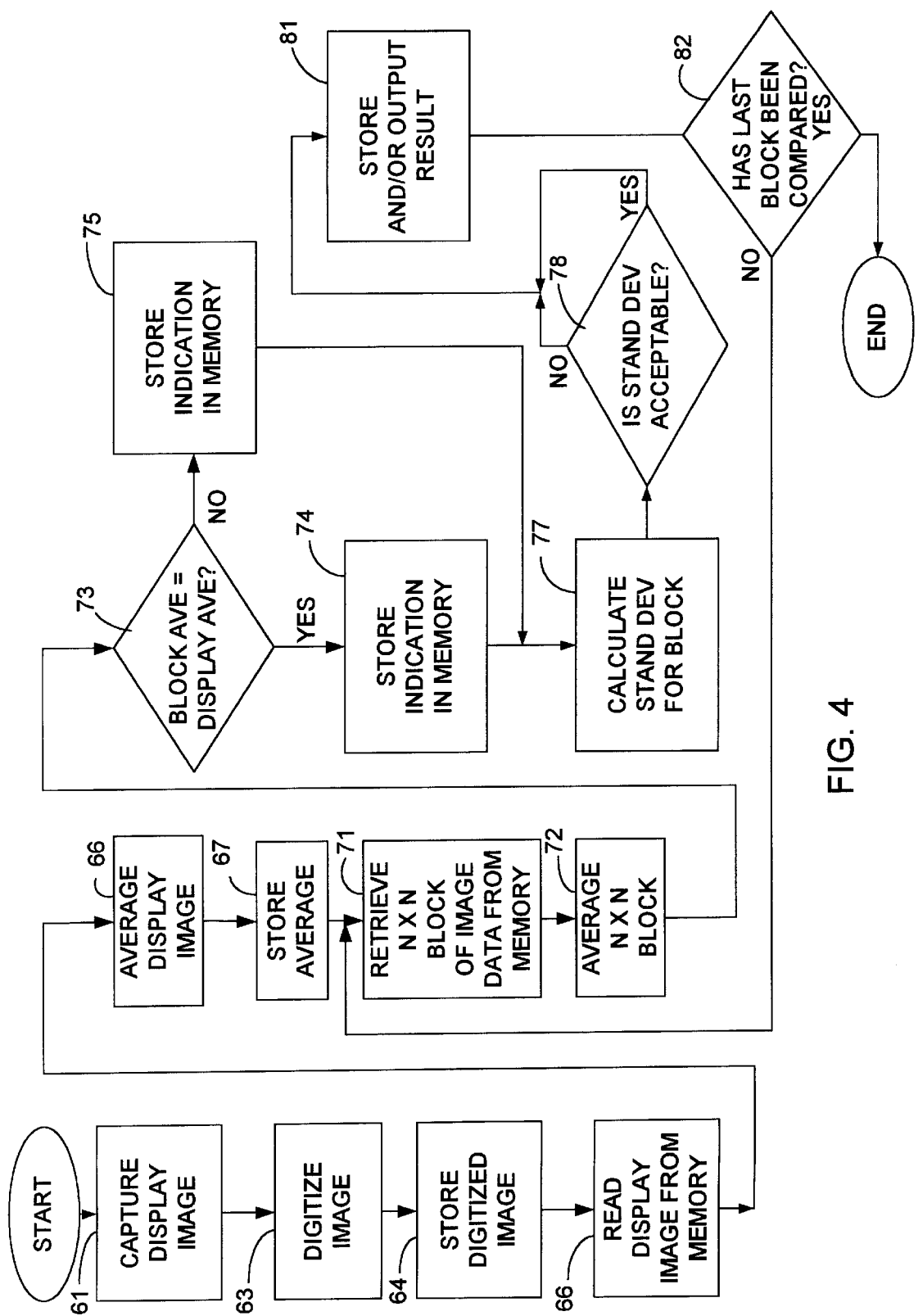
FIG. 4 is a flow chart illustrating the method utilized by the system shown in FIG. 1 in accordance with a third embodiment of the present invention for inspecting a display to determine whether defects exist in the display being inspected.

In accordance with a third embodiment of the present invention, which is illustrated in FIG. 4, large blocks of the image data are read out of memory and each block is averaged and the average of each block is compared to the display average by using the process discussed above with respect to the first embodiment. After each block has been averaged and compared to the display average, a standard deviation value is calculated for each block and a determination is made as to whether the standard deviation for each block is acceptable. The results of this determination are stored in memory and/or output via a peripheral device to the person performing the inspection. As in the embodiments discussed above, the camera 4 is focused on the display 2 such that the entire display 2 is within the field of view of the camera 4. The camera 4 then captures an image of the display 2, as indicated at step 61, digitizes the image, as indicated at step 63, and stores the digitized image in memory, as indicated at step 64.

The processing circuitry 5 then reads the image data out of memory, as indicated at step 66, and averages all of the image data to obtain an average value corresponding to the brightness of the display 2, as indicated at step 66. This average display value is then stored in memory, as indicated at step 67. Once this average value has been obtained, blocks of the image data are read out of memory, such as, for example, 100×100 pixel blocks, as indicated at step 69, and each of the blocks are averaged, as indicated at steps 71 and 72, respectively. This average value is then compared to the display average, as indicated at step 73, to determine whether or not the average value for each of the blocks is equal to the average value for the entire display. The result of this comparison is then stored in memory, as indicated at steps 74 and 75. The standard deviation is then calculated for the block, as indicated at step 77, and a determination is made as to whether the standard deviation is acceptable, as indicated at step 78. The results are then stored in memory and/or output to a suitable peripheral device, as indicated at step 81. This process is performed until the last block of the image data has been processed, as indicated at step 82.

Figure 5:
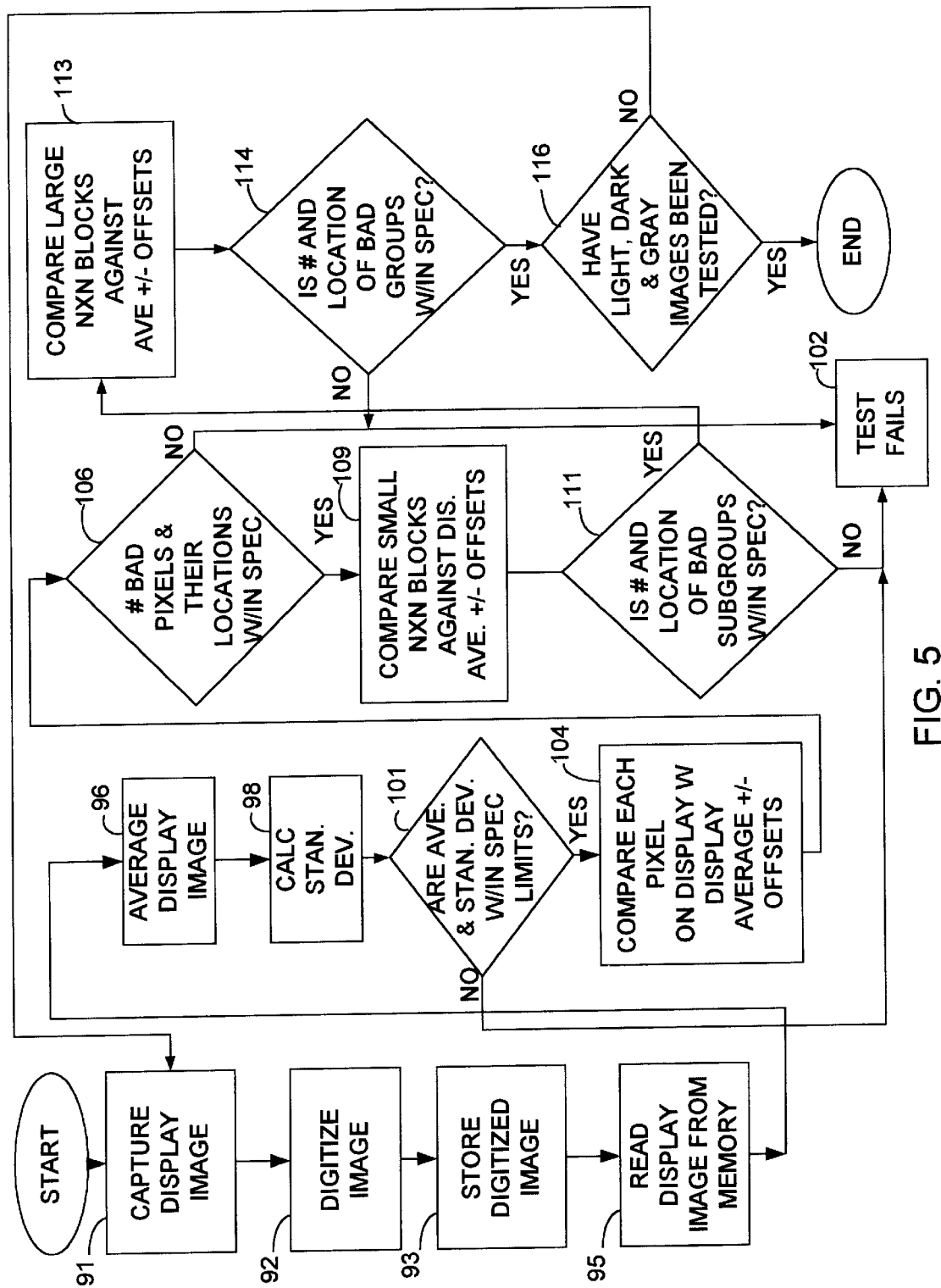
FIG. 5 is a flow chart illustrating the method utilized by the system shown in FIG. 1 in accordance with the preferred embodiment of the present invention for determining whether defects exist in a display being inspected.

The preferred embodiment of the present invention, which is illustrated by the flowchart of FIG. 5, incorporates the processes of the first, second and third embodiments of the present invention discussed above in detail. In accordance with the preferred embodiment, once display image has been captured, digitized and stored in memory, as indicated at steps 91, 92 and 93, respectively, the image data is read from memory and the average and standard deviation for the display are computed, as indicated at steps 95, 96 and 98, respectively. A determination is made as to whether the standard deviation and the average for the display image are within the specification limits for the particular display being inspected, as indicated at step 101. If not, the process and circuitry of the present invention determines that the display has failed the inspection test, as indicated at step 102. If the computed average and standard deviation are within specification limits, each pixel on the display is compared with the display average +/− offsets, as indicated at step 104. The offsets are preselected tolerance values that depend on the type of display being examined and on the application for which the particular display will be used. For example, the tolerances may be very small if the display being inspected is going to be used as a monitor of a graphics workstation because it is undesirable in this case to have any defects in the display, even very minor defects. However, in the case where some defects can be tolerated, such as in the case where the display is being used as a computer monitor at an airport for displaying flight information, the offsets may be greater.

The results of this comparison are then used to determine whether the number of bad pixels, i.e., the number of pixels outside of the standard deviation of the display average, and the location of the bad pixels, are within the specifications for the particular display being inspected, as indicated at step 106. If not, the processing circuitry determines that the display being inspected has failed the test and proceeds to step 102. If so, then small blocks of pixels are averaged and the standard deviation for each of the blocks is calculated and these values are compared against the display average +/− the offsets to determine whether each of the blocks is good or bad, as indicated at step 109. A determination is then made as to whether the bad blocks, or subgroups (i.e., the number of blocks that did not fall within the computed display average +/− the offsets) and the locations of the bad subgroups, are within the specifications for the particular display being inspected, as indicated at step 111. If not, the processing circuitry determines that the display has failed the inspection test, as indicated at step 102. If so, then this process is repeated for larger blocks of pixels on the display, as indicated at steps 113 and 114. Once the entire process been performed for all of the blocks and with all of the pixels of the display, either all on, all off, or at an intermediate level, i.e., gray, as indicated at step 116.

It should be noted that the present invention has been described with respect to particular embodiments, but that the present invention is not limited with respect to those embodiments. For example, although each of the embodiments shown in FIGS. 2–5 recite a particular sequence of steps for determining whether a display being inspected is defective, those skilled in the art will understand that it may not be necessary to perform all of the steps recited and that the order in which certain steps are performed may be modified. It will also be apparent to those skilled in the art that the present invention is not limited with respect to the types of components (i.e., processing circuitry 5 and camera 4) that are utilized to perform the display inspection processes of the present invention. It will be apparent to those skilled in the art that other modifications may be made to the system of the present invention without deviating from the spirit and scope of the present invention.

What is claimed is:

1. A display inspection system for inspecting a display, the display comprising a plurality of pixels, the inspection system comprising:

an optical detection device disposed to capture an image of a display being inspected, the optical detection device outputting electrical signals representing the image captured by the optical detection device, each electrical signal corresponding to a pixel of the optical detection device; and processing circuitry for receiving the electrical signals output from the optical detection device, the processing circuitry averaging the electrical signals to obtain an average display value, the average display value corresponding to an average of the light intensity of the display, the processing circuitry averaging the electrical signals corresponding to blocks of pixels of the optical detection device to obtain average block values, the processing circuitry comparing each of the average block values with the average display value to obtain a comparison value, wherein if one of the comparison values is not approximately equal to a predetermined threshold value, the processing circuitry determines that the display being inspected fails the inspection.

2. The display inspection system of claim 1, wherein the number of pixels comprised by the display is greater than the number of pixels comprised by the optical detection device.

3. The display inspection system of claim 1, wherein, prior to averaging the electrical signals to obtain the average display value, the processing circuitry digitizes the electrical signals to obtain digital image data and stores the digital image data in a memory device comprised by the processing circuitry, wherein once the digital image data has been stored in the memory device, the processing circuitry reads the digital image data out of the memory device and averages the digital image data to obtain the average display value.

4. The display inspection system of claim 1, wherein, the electrical signals output from the optical detection device are digital signals corresponding to digital image data, and wherein the processing circuitry stores the digital image data in a memory device comprised by the processing circuitry, wherein once the digital image data has been stored in the memory device, the processing circuitry reads the digital image data out of the memory device and averages the digital image data to obtain the average display value.

5. The display inspection system of claim 2, wherein the optical detection device is a charge coupled device.

6. The display inspection system of claim 5, wherein each pixel of the optical detection device is defined by at least 8 bits.

7. The display inspection system of claim 3, wherein the processing circuitry includes an analog-to-digital converter and a computer, the analog-to-digital converter converting the electrical signals output from the optical detection device into digital values, the computer calculating the average display value and the average block values and comparing the average block values to the average display value.

8. The display inspection system of claim 4, wherein the processing circuitry includes a computer, the computer calculating the average display value and the average block values and comparing the average block values to the average display value.

9. The display inspection system of claim 1, wherein the processing circuitry uses the average display value to calculate a standard deviation value for the display being inspected, the processing circuitry comparing the calculated standard deviation value with a threshold standard deviation value to determine whether the display being inspected is defective.

10. The display inspection system of claim 8, wherein the computer uses the average display value to calculate a standard deviation value for the display being inspected, the computer comparing the calculated standard deviation value with a threshold standard deviation value to determine whether the calculated standard deviation value is within specification limits for the particular display being inspected, wherein if the computer determines that the calculated standard deviation is within specification limits, the computer compares each pixel value of the display with a first sum value equal to the average display value plus an offset value and with a second sum value equal to the average display value minus an offset value, wherein if the compared display pixel value is greater than the first sum, the computer determines that the display pixel corresponding to the compared display pixel value is defective, and wherein if the compared display pixel value is less than the second sum, the computer determines that the display pixel corresponding to the display pixel value compared to the second sum is defective.

11. The display inspection system of claim 10, wherein the computer counts the number of defective display pixels to obtain a defective pixel sum, the computer comparing the defective pixel sum to a predetermined threshold value to determine whether the number of defective pixels exceeds the predetermined threshold value, wherein if the computer determines that the defective pixel sum exceeds the predetermined threshold value, the computer determines that the display is defective.

12. The display inspection system of claim 11, wherein if the computer determines that the defective pixel sum does not exceed the predetermined threshold, the computer compares pixel values for small blocks of display pixels with a third sum value equal to the average display value plus an offset value and with a fourth sum value equal to the average display value minus an offset value, wherein if the compared display pixel value is greater than the third sum, the computer determines that the display pixel corresponding to the compared display pixel value compared to the third sum is defective, and wherein if the compared display pixel value is less than the fourth sum, the computer determines that the display pixel corresponding to the display pixel value compared to the fourth sum is defective, wherein if the number of defective display pixels of a particular block exceeds a predetermined number, the computer determines that the particular block is defective.

13. The display inspection system of claim 12, wherein the computer counts the number of defective blocks to obtain a defective block sum and compares the number of defective blocks to a predetermined defective block threshold number, wherein if the defective block sum exceeds the predetermined defective block threshold number, the computer determines that the display being inspected is defective.

14. A display inspection system for inspecting displays, the inspection system comprising:

means for capturing an image of a display being inspected, said means for capturing outputting electrical signals representing the captured image, each electrical signal corresponding to a pixel of the means for capturing; and means for processing the electrical signals output from the optical detection device, the means for processing averaging the electrical signals to obtain an average display value, the average display value corresponding to an average of the light intensity of the display, the means for processing averaging the electrical signals corresponding to blocks of pixels of the means for capturing to obtain average block values, the means for processing comparing each of the average block values with the average display value to obtain a comparison value, wherein if one of the comparison values is not approximately equal to a predetermined threshold value, the means for processing determines that the display being inspected fails the inspection.

15. The display inspection system of claim 14, wherein, prior to averaging the electrical signals to obtain the average display value, the means for processing digitizes the electrical signals to obtain digital image data and stores the digital image data in a memory device comprised by the means for processing, wherein once the digital image data has been stored in the memory device, the means for processing reads the digital image data out of the memory device and averages the digital image data to obtain the average display value.

16. The display inspection system of claim 14, wherein, prior to the electrical signals being output to the processing circuitry, the means for capturing digitizes the electrical signals to obtain digital image data that represents the electrical signals and stores the digital image data in a memory device comprised by the means for processing, wherein once the digital image data has been stored in the memory device, the means for processing reads the digital image data out of the memory device and averages the digital image data to obtain the average display value.

17. The display inspection system of claim 14, wherein the number of pixels comprised by the display is greater than the number of pixels comprised by the means for capturing.

18. The display inspection system of claim 14, wherein the means for capturing is a charge coupled device.

19. The display inspection system of claim 14, wherein each pixel of the means for capturing is defined by at least 8 bits.

20. The display inspection system of claim 14, wherein the means for processing includes a computer, the computer calculating the average display value and the average block values and comparing the average block values to the average display value.

21. The display inspection system of claim 14, wherein the means for processing uses the average display value to calculate a standard deviation value for the display being inspected, the means for processing comparing the calculated standard deviation value with a threshold standard deviation value to determine whether the display being inspected is defective.

22. The display inspection system of claim 21, wherein the computer uses the average display value to calculate a standard deviation value for the display being inspected, the computer comparing the calculated standard deviation value with a threshold standard deviation value to determine whether the calculated standard deviation value is within specification limits for the particular display being inspected, wherein if the computer determines that the calculated standard deviation is within specification limits, the computer compares each pixel value of the display with a first sum value equal to the average display value plus an offset value and with a second sum value equal to the average display value minus an offset value, wherein if the compared display pixel value is greater than the first sum, the computer determines that the display pixel corresponding to the compared display pixel value is defective, and wherein if the compared display pixel value is less than the second sum, the computer determines that the display pixel corresponding to the display pixel value compared to the second sum is defective.

23. The display inspection system of claim 22, wherein the computer counts the number of defective display pixels to obtain a defective pixel sum, the computer comparing the defective pixel sum to a predetermined threshold value to determine whether the number of defective pixels exceeds the predetermined threshold value, wherein if the computer determines that the defective pixel sum exceeds the predetermined threshold value, the computer determines that the display is defective.

24. The display inspection system of claim 23, wherein if the computer determines that the defective pixel sum does not exceed the predetermined threshold, the computer compares pixel values for small blocks of display pixels with a third sum value equal to the average display value plus an offset value and with a fourth sum value equal to the average display value minus an offset value, wherein if the compared display pixel value is greater than the third sum, the computer determines that the display pixel corresponding to the compared display pixel value compared to the third sum is defective, and wherein if the compared display pixel value is less than the fourth sum, the computer determines that the display pixel corresponding to the display pixel value compared to the fourth sum is defective, wherein if the number of defective display pixels of a particular block exceeds a predetermined number, the computer determines that the particular block is defective.

25. The display inspection system of claim 24, wherein the computer counts the number of defective blocks to obtain a defective block sum and compares the number of defective blocks to a predetermined defective block threshold number, wherein if the defective block sum exceeds the predetermined defective block threshold number, the computer determines that the display being inspected is defective.

26. A method for inspecting a display comprising a plurality of pixels, the method comprising:
    capturing an image of a display being inspected and generating electrical signals representing the captured image, each electrical signal corresponding to a pixel of an optical detection device;
    averaging all of the electrical signals to obtain an average display value, the average display value corresponding to an average of the light intensity of the display;
    averaging the electrical signals corresponding to blocks of pixels of the optical detection device to obtain average block values;
    comparing each of the average block values with the average display value to obtain a comparison value; and
    determining, based on the results of the comparison, whether the display being inspected fails the inspection.

27. The method of claim 26, wherein the number of pixels comprised by the display is greater than the number of pixels comprised by the optical detection device.

28. The method of claim 26, wherein, prior to the step of averaging the electrical signals to obtain the average display value, the electrical signals are digitized to obtain digital image data and the digital image data is stored in a memory device, wherein after the digital image data has been stored in the memory device, the digital image data is read out of the memory device and averaged to obtain the average display value.

29. The method of claim 28, wherein the optical detection device is a charge coupled device.

30. The method of claim 29, wherein each pixel of the optical detection device is defined by at least 8 bits.

31. The method of claim 30, wherein after the step of calculating the average display value, a standard deviation value for the display being inspected is calculated and the calculated standard deviation value is compared with a threshold standard deviation value to determine whether the calculated standard deviation value is within specification limits for the particular display being inspected.

32. The method of claim 28, wherein if the calculated standard deviation is within specification limits, each pixel value of the display is compared with a first sum value equal to the average display value plus an offset value and with a second sum value equal to the average display value minus an offset value, wherein if the compared display pixel value is greater than the first sum, a determination is made that the display pixel corresponding to the compared display pixel value is defective, and wherein if the compared display pixel value is less than the second sum, a determination is made that the display pixel corresponding to the display pixel value compared to the second sum is defective.

33. The method of claim 32, wherein the number of defective display pixels is counted to obtain a defective pixel sum and the defective pixel sum is compared to a predetermined threshold value to determine whether the number of defective pixels exceeds the predetermined threshold value, wherein if the defective pixel sum exceeds the predetermined threshold value, a determination is made that the display is defective.

34. The method of claim 33, wherein if the defective pixel sum does not exceed the predetermined threshold, pixel values for small blocks of display pixels are compared with a third sum value equal to the average display value plus an offset value and with a fourth sum value equal to the average display value minus an offset value, wherein if the compared display pixel value is greater than the third sum value, a determination is made that the display pixel corresponding to the display pixel value compared to the third sum is defective, and wherein if the compared display pixel value is less than the fourth sum, a determination is made that the display pixel corresponding to the display pixel value compared to the fourth sum is defective, wherein if the number of defective display pixels of a particular block exceeds a predetermined number, a determination is made that the particular block is defective.

35. The method of claim 34, wherein the number of defective blocks is counted to obtain a defective block sum and the defective block sum is compared to a predetermined defective block threshold number, wherein if the defective block sum exceeds the predetermined defective block threshold number, a determination is made that the display being inspected is defective.

36. A computer-readable medium having a computer program thereon, the computer program comprising:
    a first code segment for storing digital data signals corresponding to an image of a display being inspected in a memory device, each digital data signal corresponding to a pixel of an optical detection device used to capture the image of the display, each pixel of the optical detection device viewing at least one pixel of the display being inspected;

a second code segment for retrieving the digital data signals from the memory device and for averaging all of the digital data signals to obtain an average display value, the average display value corresponding to an average of the light intensity of the display;

a third code segment for averaging the digital data signals corresponding to blocks of the pixels of the display to obtain average block values, each block of pixels corresponding to a predetermined number of contiguous display pixels;

a fourth code segment for comparing each of the average block values with the average display value to obtain a comparison value; and a fifth code segment for determining, based on the results of the comparison, whether the display being inspected fails the inspection.

37. The computer-readable medium of claim 36, wherein the computer program further comprises a sixth code segment for calculating a standard deviation value for the display being inspected and for comparing the calculated standard deviation value with a threshold standard deviation value to determine whether the calculated standard deviation value is within specification limits for the particular display being inspected.

38. The computer-readable medium of claim 37, wherein the computer program further comprises a seventh code segment for comparing each pixel value of the display with a first sum value equal to the average display value plus an offset value and with a second sum value equal to the average display value minus an offset value, wherein if the compared display pixel value is greater than the first sum, the seventh code segment determines that the display pixel corresponding to the compared display pixel value is defective, and wherein if the compared display pixel value is less than the second sum, the seventh code segment determines that the display pixel corresponding to the display pixel value compared to the second sum is defective.

39. The computer-readable medium of claim 38, wherein the computer program further comprises an eighth code segment for counting the number of defective display pixels to obtain a defective pixel sum and for comparing the defective pixel sum to a predetermined threshold value to determine whether the number of defective pixels exceeds the predetermined threshold value, wherein if the defective pixel sum exceeds the predetermined threshold value, the eighth code segment determines that the display is defective.

40. The computer-readable medium of claim 39, wherein if the defective pixel sum does not exceed the predetermined threshold, the eighth code segment compares pixel values for small blocks of display pixels with a third sum value equal to the average display value plus an offset value and with a fourth sum value equal to the average display value minus an offset value, wherein if the compared display pixel value is greater than the third sum value, the eighth code segment determines that the display pixel corresponding to the display pixel value compared to the third sum is defective, and wherein if the compared display pixel value is less than the fourth sum, the eighth code segment determines that the display pixel corresponding to the display pixel value compared to the fourth sum is defective, wherein if the number of defective display pixels of a particular block exceeds a predetermined number, the eighth code segment determines that the particular block is defective.

41. The computer-readable medium of claim 40, wherein the computer program further comprises a ninth code segment, the ninth code segment counting the number of defective blocks is to obtain a defective block sum and comparing the defective block sum to a predetermined defective block threshold number, wherein if the defective block sum exceeds the predetermined defective block threshold number, a determination is made that the display being inspected is defective.

\* \* \* \* \*